UNITED STATES PATENT OFFICE.

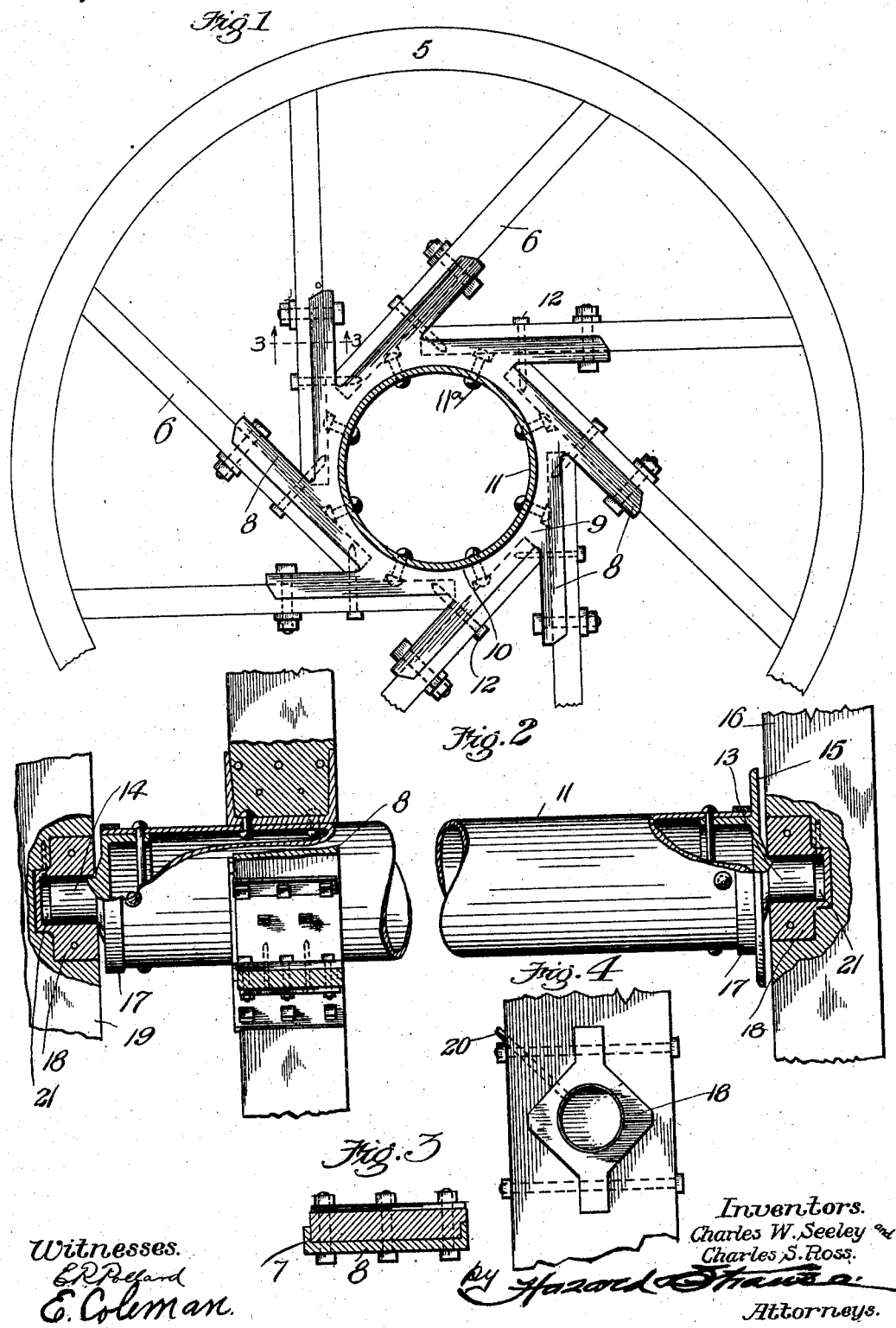

CHARLES W. SEELEY AND CHARLES S. ROSS, OF HOLLYWOOD, CALIFORNIA.

WHEEL.

981,128.      Specification of Letters Patent.    Patented Jan. 10, 1911.

Application filed November 20, 1909. Serial No. 529,126.

*To all whom it may concern:*

Be it known that we, CHARLES W. SEELEY and CHARLES S. ROSS, citizens of the United States, residing at Hollywood, in the county of Los Angeles and State of California, have invented new and useful Improvements in Wheels, of which the following is a specification.

Our invention relates more particularly to the construction of wheel hubs and shafts, and it is one of the objects of our invention to provide a hub and shaft construction, whereby the rim and spokes of a wheel may be secured thereto or detached therefrom.

Heretofore in wheel construction and particularly in those types of wheels used in the drilling of oil wells commonly known as "bull wheels" octagonal wooden shafts have been employed, the spokes being spiked to the surfaces of the shaft. The constant wear of the cable pull ropes and brakes loosens the arms, splits the wood and renders the wheel useless in a short time. By means of our improved hub construction the above recited troubles and difficulties are largely obviated, as the arms can be instantly removed when broken and new ones substituted therefor in a minimum space of time.

In the accomplishment of the above objects we preferably employ a hollow cylindrical shaft provided with suitable trunnions, a metal hub being rigidly secured thereto and provided with means for securing the arms of the wheel in detachable relation thereto.

In the drawings annexed hereto and forming a part of this specification: Figure 1— is a side elevation of a "bull wheel" of usual construction, showing our improved hub construction in place therein. Fig. 2— is a front elevation of a wheel mounted in bearings, portions being broken away for clarity of illustration. Fig. 3— is a section of one of the attaching arms of the hub taken on line 3—3 of Fig. 1. Fig. 4— is a side elevation of one of the shaft bearings.

Referring more specifically to the drawings, 5 designates the rim of a "bull wheel" of usual construction, having attached thereto in a suitable manner spokes 6. The inner or lower ends of these arms are rigidly secured by means of bolts or other securing means in channel seats 7 formed in a plurality of metal arms 8 that are preferably formed integral with a hub 9, which is provided with a central bore 10, through which passes a hollow cylindrical metal shaft 11, the shaft being riveted or otherwise secured to the hub 9. An additional securing means for the arms is provided by the lag screws 12 which pass through one arm into an adjacent arm as clearly shown in Fig. 1 of the drawings, the arms being wedged into the seats 7, thus rigidly securing the arms to the hub. By socketing the spokes 6 in the metal arms 8 it will be observed that the pull ropes will not contact therewith, thus eliminating any wear on the spokes.

The hollow cylindrical shaft 11 is provided with trunnions 13 and 14, one at each end thereof and rigidly secured thereto by any suitable means. Trunnion 13 is provided with a flange 15 which prevents the cable, which is wound on shaft 11, from contacting with the bearing post 16. Metal bands 17 are provided for the ends of shaft 11, the bands being shrunk on so as to maintain the trunnions in immovable relation to the shaft.

The trunnions are revolubly mounted in journal boxes 18 secured in a suitable manner in the bearing posts 16, 19, each box having an oil way 20, which communicates with cavities 21, which are formed by the ends of the trunnion and the bottom of the recessed boxes. These boxes are preferably provided with babbited linings.

If for any reason the spokes should become loosened from the metal arms 8 it will be a comparatively easy matter to remove and replace the same with new ones, the hub, arms and shaft being of metal, all strains imposed thereon by the operation of the cables and brakes are taken care of.

From the foregoing description it will be apparent that by means of our improved hub construction all troubles and difficulties usually experienced in wheels of the above described type are entirely eliminated.

With a wheel hub constructed as described it is unnecessary to provide a hub with side extensions or sleeves for securing the same to the shaft for the reason that the tangential arrangement of the spokes enables fastening devices such as rivets 11$^a$ to be applied through the bottoms of the channels which hold the spokes as indicated in Fig. 1.

Having described our invention what we claim as new and desire to secure by Letters Patent is:

In combination, a shaft, a wheel hub mounted on said shaft having a plurality of short arms disposed tangentially with respect to said shaft, said arms being of channel form and forming sockets with side flanges disposed in planes at right angles to the axis of said shaft, fastening devices applied in the bottoms of said channels and securing said hub to said shaft, and removable spokes secured in said channels and held against lateral movement by said flanges.

In witness that we claim the foregoing we have hereunto subscribed our names this 6th day of November, 1909.

C. W. SEELEY.
      C. S. ROSS.

Witnesses as to C. W. Seeley:
 EDMUND A. STRAUSE,
 ETHEL COLEMAN.

Witnesses as to Charles S. Ross:
 W. M. LAMB,
 C. E. GOOD.